May 18, 1926.
W. B. DOW
ICE CREAM DISHER
Filed July 8, 1925
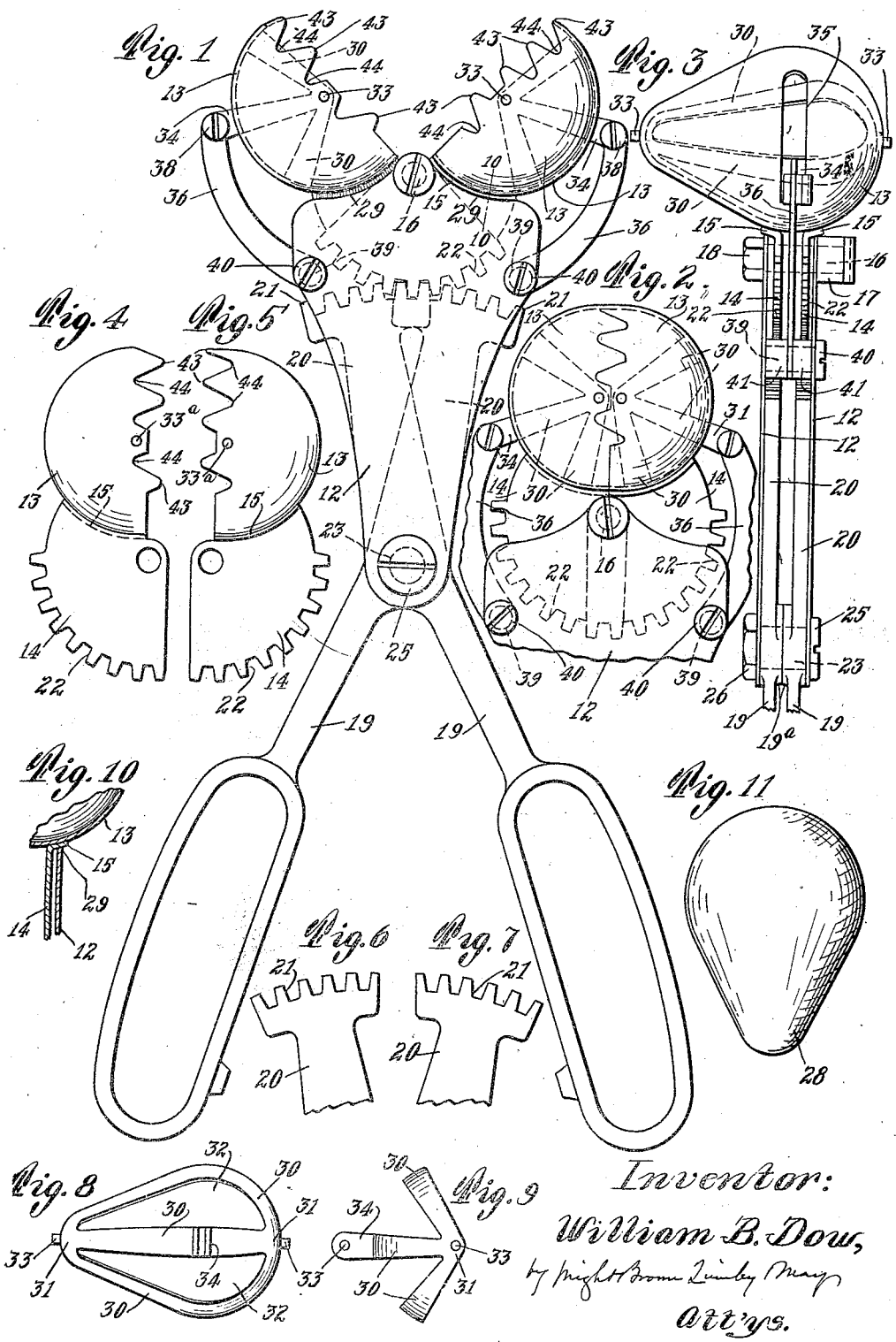
Inventor:
William B. Dow,
by Wright Brown Quinby May
Att'ys.

Patented May 18, 1926.

1,584,757

UNITED STATES PATENT OFFICE.

WILLIAM B. DOW, OF WALTHAM, MASSACHUSETTS.

ICE-CREAM DISHER.

Application filed July 8, 1925. Serial No. 42,154.

This invention relates to dishers adapted to be inserted in a mass of ice cream, take up and form a charge or portion of predetermined shape, and deposit the charge in a receptacle for use by a consumer.

The object of the invention is to provide a disher of strong and durable construction including a sectional mold composed of a pair of cups, and adapted to be opened and closed, and to be forced when opened into a mass of ice cream, closed in the mass to form a charge, and opened after withdrawal from the mass to drop the charge into a receptacle such as an edible cone.

Of the accompanying drawings forming a part of this specification,—

Figure 1 is a side elevation of a disher embodying the invention, the sectional mold being open.

Figure 2 is a view similar to a portion of Figure 1 showing the mold closed.

Figure 3 is an edge view of the disher showing the mold closed, the handles being broken away.

Figures 4 and 5 show the cups and their gear segments separately.

Figures 6 and 7 show portions of the arms shown by Figures 1 and 3.

Figure 8 is a side view, and Figure 9 an end view of one of the scrapers hereinafter described.

Figure 10 is a fragmentary section on line 10—10 of Figure 1.

Figure 11 is a perspective view of a charge formed by the sectional mold.

The same reference characters indicate the same parts in all of the figures.

My improved disher comprises a rigid holder preferably composed of two side plates or members 12, 12 rigidly connected, and spaced apart as shown by Figure 3, the connections between said members being described hereinafter. 13, 13 designate cups constituting a sectional mold adapted to be opened as shown by Figure 1, and closed as shown by Figure 2. Each cup is provided with an ear 14 preferably attached to the cup by a segmental flange 15 formed on the ear and brazed or soldered to the cup. The ears are pivoted to one end portion of the holder so that the cups project from this end portion and are adapted to be thrust, when opened, into a mass of ice cream. The pivotal connection between the ears 14 and the holder is preferably provided by a pivot stud 16 inserted in coinciding orifices in the holder members 12 and ears 14, and provided with a head contacting with a washer 17 (Figure 3) bearing on one member 12, and with a nut 18 bearing on the other member. 19, 19 designate a pair of handles pivoted to and projecting from the opposite end of the holder, the handles being adapted to be grasped by the operator and moved simultaneously in opposite directions.

I provide means supported by the holder for transmitting motion from the handles to the cups 13 to open and close the mold, the said means being preferably embodied in arms 20 fixed to the handles and projecting therefrom into the space between the holder members 12, segmental racks 21 formed on the inner ends of the arms, and segmental series of gear teeth 22 formed on the ears 14 and meshing with the racks, the ears constituting gear segments.

The pivotal connection between the handles and the holder is preferably provided by a pivot stud 23 inserted in coinciding orifices in the members 12 and handles 19, and provided with a head 25 bearing on one member 12 and with a nut 26 bearing on the other member. The handles, their arms 20, and the cup ears 14, are located side by side in different planes as shown by Figure 3, so that each arm 20 and the cup ear 14 meshing therewith is located in a different plane from the other handle arm and cup ear, said arms and ears being movable in parallel paths beside each other. The arrangement is such that when the handles 19 are moved apart as shown by Figure 1, the cups are separated so that the mold is opened and adapted to be forced into a mass of ice cream. When the handles are moved toward each other, the mold is closed upon the material between the cups and forms a charge or portion 28 (Figure 11).

The holder is provided with stops adapted and arranged to positively arrest the cups in the position shown by Figure 1, and thus limit the mold-opening movement of the handles and at the same time positively support the cups against the pressure required to force them into a mass of ice cream, which is often of considerable density. These stops are preferably provided by curved elongated edge portions 29 formed on the holder members 12. A portion of each cup is adapted to abut against one of the stops 29, when the mold is open, said portion being preferably the flange 15 on the ear 14. The flange on one ear projects oppositely from the flange on the other ear, so that one flange is adapted to abut against a stop 29 on one holder member 12, and the other flange is adapted to abut against a stop 29 on the other holder member.

To prevent adhesion of the charge 28 to the cups when the mold is being opened, I provide scrapers which are preferably of sheet metal, and shaped to conform to the internal surfaces of the cups, each scraper preferably including longitudinal portions 30 (Figures 8 and 9) and end portions 31, openings 32 being formed between the portions 30. To the end portions 31 are fixed oppositely projecting trunnions 33 journalled in bearings 33ª in the cups. One of the portions 30 of each scraper is provided with an arm 34 projecting through a slot 35 (Figure 3) in the accompanying cup. The scraper arms are connected with the holder by links 36 pivoted to the arms and holder. The links confine the scrapers when the cups are swinging to open and close the mold, so that the relative positions of the cups and scrapers are changed by the opening and closing of the mold, as will be seen by comparing Figure 1 with Figure 2. The scrapers are therefore adapted to loosen the charge when the mold is being opened, so that the charge will drop freely from the opened mold.

The pivotal connection between the links and the scraper arms may be provided by pivot screws 38. The pivotal connection between the links and the holder members 12 is preferably provided by pivot screws 39 having heads 40 bearing on one of the members 12, and threaded portions engaged with tapped orifices in the other member.

Spacing collars or washers 41 (Figure 3) mounted on the studs 39 are interposed between the links 36 and the holder members 12. The holder members 12 are rigidly connected by the studs 16, 23, and 39, and are spaced apart by the spacing collars 41 and the thickened portions 19ª of the handles 19. Each cup is preferably provided at its edge with projections or teeth 43 adapted to facilitate movement of the edge through ice cream, and with recesses 44 alternating with the projections. The projections on one cup enter the recesses in the other cup when the mold is fully closed as shown by Figure 2.

The cups are preferably shaped to form an elongated charge 28 having a substantially semispherical end portion and a substantially conical end portion as shown by Figure 11, the conical portion being adapted to fit an edible cone.

It will be seen that each operation of the disher forms a charge of predetermined shape and weight, so that all charges dispensed are uniform in these respects.

I claim:

1. An ice cream disher comprising a rigid holder, composed of side members rigidly connected and spaced apart, a sectional mold composed of a pair of cups pivoted to and projecting from one end of the holder, a pair of handles pivoted to and projecting from the opposite end of the holder and movable simultaneously in opposite directions, and means supported by the holder for transmitting motion from the handles to the cups to open and close the mold.

2. An ice cream disher comprising a holder, composed of side members rigidly connected and spaced apart, a sectional mold composed of a pair of cups pivoted to and projecting from one end of the holder, a pair of handles pivoted to and projecting from the opposite end of the holder and movable simultaneously in opposite directions, and means supported by the holder for transmitting motion from the handles to the cups to open and close the mold, the holder being provided with rigid stops arranged to positively arrest the cups and limit the mold opening movements of the handles when the mold is fully opened, said stops positively supporting the cups against the pressure required to force them into a mass of ice cream.

3. An ice cream disher comprising a holder, a sectional mold composed of a pair of cups pivoted to and projecting from one end of the holder, a pair of handles pivoted to and projecting from the opposite end of the holder and movable simultaneously in opposite directions, means for transmitting motion from the handles to the cups to open and close the mold, scrapers pivoted to the cups and conforming to the inner surfaces thereof, said scrapers having arms projecting through slots in the cups, and links pivoted to the arms and holder and confining the scrapers when the cups are swinging to open and close the mold, so that the scrapers are adapted to loosen a charge formed by the mold.

4. An ice cream disher comprising a holder, a sectional mold composed of a pair of cups pivoted to and projecting from one end of the holder and provided with gear segments, a pair of handles pivoted to and projecting from the opposite end of the holder, movable simultaneously in opposite directions, and provided with arms having segmental racks meshing with the gear segments, said arms, racks, and gear segments being arranged to transmit motion from the handles to the cups, to open and close the mold.

5. An ice cream disher comprising a holder composed of parallel side members rigidly connected and spaced apart, a sectional mold composed of a pair of cups projecting from one end of the holder and having ears projecting into the space between the side members, a pivot connecting said ears with the side members at one end of the holder, the ears being formed as gear segments, a pair of handles located side by side and projecting from the opposite end of the holder, a pivot connecting the handles with the holder, and arms fixed to the handles and projecting into the space between the side members, the arms having segmental racks meshing with the gear segments, each handle, arm, and the cup ear, meshing therewith, being located in a different plane from the other handle, arm and cup ear, so that the arms and ears are movable in parallel paths beside each other.

In testimony whereof I have affixed my signature.

WILLIAM B. DOW.